United States Patent [19]

Ascoli

[11] 4,334,163
[45] Jun. 8, 1982

[54] DC ELECTRIC MOTORS

[75] Inventor: Enzo Ascoli, Lausanne, Switzerland

[73] Assignee: The Gillette Company, Boston, Mass.

[21] Appl. No.: 81,492

[22] Filed: Oct. 1, 1979

Related U.S. Application Data

[63] Continuation of Ser. No. 862,709, Dec. 21, 1977, abandoned.

[30] Foreign Application Priority Data

Jun. 4, 1977 [GB] United Kingdom ............... 23835/77

[51] Int. Cl.³ ............................................ H02K 5/16
[52] U.S. Cl. ..................................... 310/90; 310/50;
310/154; 310/206; 310/234; 310/251
[58] Field of Search ............. 310/47, 50, 40 MM, 44,
310/90, 157, 239, 242, 46, 154, 206, 202, 179,
180, 261, 264, 265, 198, 234, 235, 237, 266, 233,
68 R, DIG. 6, 208, 89, 248–253; 320/2

[56] References Cited

U.S. PATENT DOCUMENTS

| 2,387,885 | 10/1945 | Davis | 310/233 |
|---|---|---|---|
| 2,400,902 | 5/1946 | Allen | 310/234 |
| 2,525,297 | 10/1950 | Heidmann | 310/233 UX |
| 2,779,883 | 1/1957 | Schumann | 310/50 |
| 3,225,232 | 12/1965 | Turley | 310/50 |
| 3,381,154 | 4/1968 | Madsen | 310/213 |
| 3,452,226 | 6/1969 | Hettich | 310/50 |
| 3,693,037 | 9/1972 | West | 310/154 |
| 3,743,875 | 7/1973 | Smith | 310/198 |
| 4,088,914 | 5/1978 | Aoki | 310/264 |

FOREIGN PATENT DOCUMENTS

| 1513786 | 5/1970 | Fed. Rep. of Germany | 310/154 |
|---|---|---|---|
| 2608561 | 9/1976 | Fed. Rep. of Germany | 310/DIG. 3 |
| 1198685 | 7/1970 | United Kingdom | 310/266 |
| 1337887 | 2/1972 | United Kingdom | 310/266 |
| 1343920 | 1/1974 | United Kingdom | 310/67 |

Primary Examiner—R. Skudy
Attorney, Agent, or Firm—Raymond J. De Vellis

[57] ABSTRACT

A DC electric motor comprising a tubular support carrying spaced bearings, a shaft journalled in said bearings for coaxial rotation within said support and having a driven end portion extending from a first end length of said tubular support, a rotor comprising a hollow cylindrical rotor body carrying a rotor winding, said rotor body being secured at one end to said extending shaft portion so that the first end length of said tubular support is coaxially freely received within said hollow cylindrical rotor body, a stator surrounding said rotor, and a commutator mounted to said shaft end portion at the exterior side of said rotor body remote from said tubular support.

6 Claims, 5 Drawing Figures

DC ELECTRIC MOTORS

This is a continuation of application Ser. No. 862,709, filed Dec. 21, 1977, now abandoned.

BACKGROUND OF THE INVENTION

This invention relates to electric motors. One application is to small DC electric motors suitable for battery powered electric dry shavers, for example as disclosed in our co-pending U.S. patent application Ser. No. 886,482, a continuation of U.S. patent application Ser. No. 681,769, filed Apr. 29, 1976 and U.S. Pat. Nos. 4,092,581, and 4,115,920.

A known type of small DC electric motor suitable for this purpose comprises a tubular support, a shaft journalled for rotation within said support and extending therefrom to carry a rotor and a commutator at a free end thereof. The tubular support supports a central cylindrical permanent magnet. The rotor is bell-shaped, consisting essentially of a winding without a core but held in shape by adhesive or similar minimal support. The rotor surrounds the cylindrical magnet, and a magnetic shell surrounds the rotor to complete the magnetic circuit.

One disadvantage is that such bell-shaped rotors are difficult and thus expensive to manufacture in quantity. This is particularly true for battery powered motors where the supply voltage is low, e.g. 1.2 or 2.4 volts, thus requiring larger diameter winding leads. The central permanent magnet, requiring magnetization across a diameter, is also expensive. Furthermore a bell-shaped rotor has a very low moment of inertia. That can be a disadvantage in a number of applications, for example dry shavers, where the load is variable and a fly-wheel effect would thus be desirable.

Wound rotors are known per se and are less expensive than bell-shaped rotors, but a number of difficulties arise in adapting such DC electric motors to employ wound rotors in such applications as electric dry shavers wherein strict dimensional space limitations are present and wherein features of the driven appliance and of the power supply dictate a number of constructional demands on the motor itself.

SUMMARY OF THE INVENTION

According to the present invention there is provided a DC electric motor comprising a tubular support carrying spaced bearings, a shaft journalled in said bearings for coaxial rotation within said support and having a driven end portion extending from a first end length of said tubular support, a rotor comprising a hollow cylindrical rotor body carrying a rotor winding, said rotor body being secured at one end to said extending shaft portion so that the first end length of said tubular support is coaxially freely received within said hollow cylindrical rotor body, a stator surrounding said rotor, and a commutator mounted to said shaft end portion at the exterior side of said rotor body remote from said tubular support.

Said tubular support preferably carries first and second said bearings at opposite ends thereof, said first bearing lying within and said second bearing lying outside said hollow cylindrical rotor body, and the shaft having a driving end portion extending from the second bearing at the second end of said tubular support.

In one embodiment said rotor body is formed with a plurality of generally longitudinal slots and said rotor winding comprises a plurality of coils, only one coil side of one said coil lying within each said slot. In this embodiment the commutator has a plurality of segments one half that of the number of said rotor body slots.

In another embodiment said rotor body has a substantially right circular cylindrical exterior surface and said rotor winding comprises a plurality of coils lying on said rotor body surface.

BRIEF DESCRIPTION OF DRAWINGS

Embodiments of the invention will now be described, by way of example, with reference to the accompanying drawings, in which.

DESCRIPTION OF PREFERRED EMBODIMENTS

Figure 1:
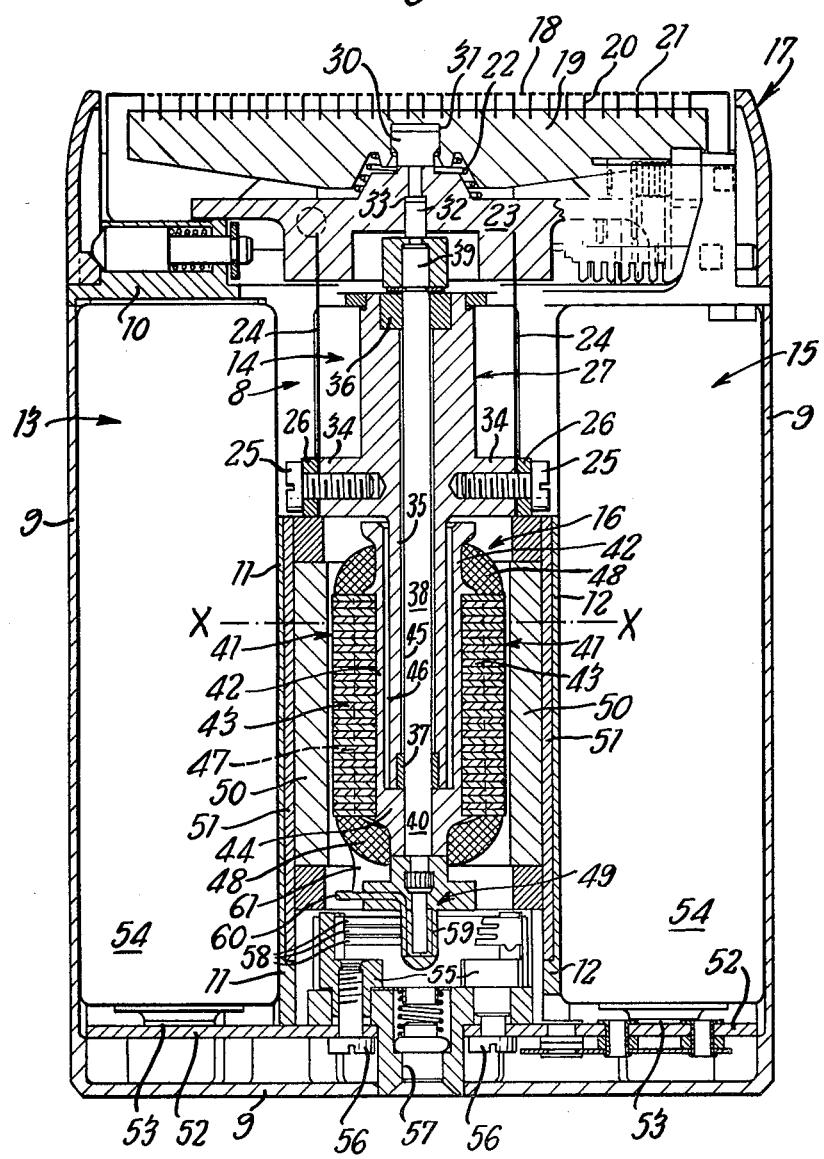
FIG. 1 is a vertical section through an electric dry shaver embodying an electric motor according to the invention.
Figure 2:
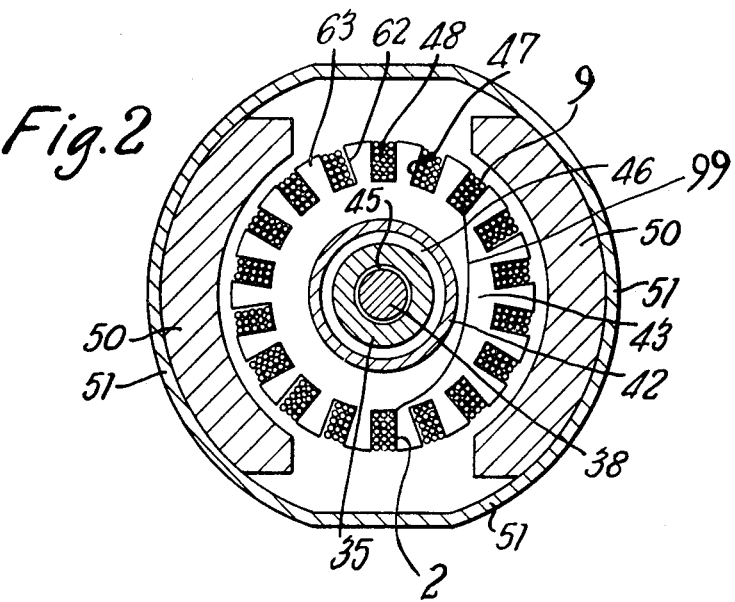
FIG. 2 is a cross-section on line X—X of FIG. 1.

Referring to FIGS. 1 and 2 there is shown an electric dry shaver comprising a structural and reference frame 8, suitably in the form of a metal casting. A casing sleeve 9 is a tight but removable sliding fit over the frame 8 to provide the outer visible wall of the shaver. The frame 8 includes an upper end transverse wall 10 and two longitudinal frame walls 11, 12 which divide the internal space of the shaver into three side-by-side elongate cylindrical compartments 13, 14 and 15. Compartments 13 and 15 are each adapted to receive a single rechargeable battery, and compartment 14 locates and secures an electric motor 16 according to the invention. In a modification compartment 13 contains a single rechargeable battery and compartment 15 contains a cylindrical recharging transformer.

The upper end transverse frame wall 10 carries a removable cutting head 17 mounting a flexible part-cylindrical curved perforated cutting foil 18. A cutter body 19 carries a plurality of cutter blades 20 having curved cutting edges 21, urged into engagement with the foil 18 by means of a frusto-conical coil spring 22 acting between a carrier block 23 and the cutter body 19.

The carrier block 23 is secured to the free ends of a pair of leaf springs 24 whose opposite ends are secured by screws 25 and washers 26 to a tubular support 27. The support 27 is in turn secured to the transverse frame wall 10 by means of screws (not shown) extending through the wall 10 into tapped bores in the support 27 on axes in front of and behind the section plane of FIG. 1. The carrier block 23 is thus mounted for substantially longitudinal oscillation, in fact a slightly curved path, constrained by flexing of the leaf springs 24 in phase with one another about their securing points at screws 25. The block 23 includes a part-spherical driver 30 received in a cylindrical bore 31 in the cutter body 19.

The cutter body 19 is thus driven in longitudinal oscillation by longitudinal oscillation of the block 23. The cutter body 19 is urged to oscillate parallel to and in engagement with the foil 18 by the virtue of the spring 22, the driver 30 oscillating axially with a small amplitude within the bore 31 to accommodate the slightly curved oscillation path of the carrier block 23 as constrained by flexing of the leaf springs 24. The cutter head 17, cutter body 19 and the carrier block 23 may be inclined as described in our co-pending British Patent Application No. 19706/76 and corresponding U.S. Pat. No. 4,115,920, if desired, so as to impose a small amplitude transverse vibration upon the longitudinal oscillation of the body 19 to improve the shaving action.

The block 23 is in turn driven in its substantially longitudinal oscillation by means of a drive pin 32 extending eccentrically from the end of a drive shaft to be described below, and working in a transverse slot 33 in the block 23.

The tubular support 27 is secured at its upper end to the wall 10 of the frame 8 as described above. It comprises an upper tubular portion of substantial thickness and rigidity, central bosses 34 to provide a rigid mounting for the leaf springs 24 and screws 25, and a lower thin-walled tubular end length 35. The tubular support carries shaft bearings 36, 37 at its upper and lower ends. A shaft 38 is journalled in the bearings 36, 37 and extends from both ends of the tubular support. The upper end 39 of the shaft carries the eccentric drive pin 32. The lower end 40 of the shaft 38 has secured thereto a rotor 41 and a commutator 49 for the electric motor 16.

The rotor 41 comprises a hollow cylindrical rotor body carrying a rotor winding. The rotor body comprises a hollow cylindrical support 42 supporting a stack of annular laminations 43. The support 42 is formed of non-magnetic material, such as aluminium, and includes an integral boss 44 secured to the lower end 40 of the shaft 38 immediately adjacent the bearing 37. The lower end length 35 of the tubular support 27 and the bearing 37 are coaxially freely received within the hollow cylindrical support 42 of the rotor 41. Suitable small annular clearances 45, 46 are left between the stationary tubular support 27 and the inner rotating shaft 38 on the one hand and the outer rotating rotor 41 on the other. The stack of annular laminations 43 in this embodiment is provided with generally longitudinal slots 47 receiving coil sides of a rotor winding 48 as will be described below.

The motor 16 further comprises a stator consisting of a pair of arcuate permanent magnets 50 disposed adjacent the rotor on opposite longitudinal sides thereof as shown in FIG. 2. The magnets 50 are secured, for example by means of adhesive, to a magnetizable iron shell 51 which is secured to and located by the frame walls 11, 12, preferably in the manner disclosed in our co-pending British Patent Application No. 18361/75 and corresponding U.S. Pat. No. 4,210,832.

A circuit board 52 is secured by screws (not shown) to the lower ends of frame walls 11, 12 within the lower end of the casing sleeve 9. The circuit board 52 is preferably as described in our co-pending British Patent Application No. 6308/76 and corresponding U.S. Pat. No. 4,092,581. Briefly the circuit board carries conductive tracks interconnecting the terminals 53 of the two batteries 54, terminals of an ON/OFF shaver switch (not shown), brush holders 55 of the electric motor shown secured to the circuit board by screws 56, and a recharging socket terminal 57 for reception of a pin of a battery charger. The brush holders 55 comprise brushes 58 for cooperation with the segments 59 of a suitably constructed motor commutator 49 such as described in U.S. Pat. No. 4,086,510. It will be appreciated that the commutator 49 is on the free lower end 40 of the shaft 38. The segments 59 are in turn connected by conductive tags 60 and wires 61 to the appropriate coils of the rotor winding 48.

Figure 5:
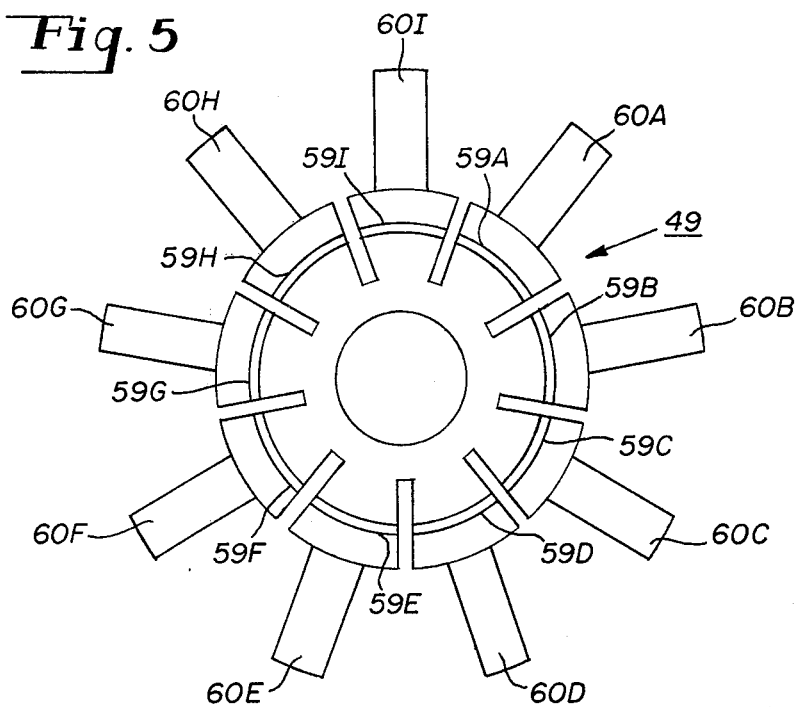
FIG. 5 is a plan view of a nine segment commutator.

Referring to FIG. 2 it will be seen that the rotor lamination stack 43 has eighteen slots 62. The winding 48 comprises nine coils and thus each slot 62 receives only one coil side of one coil. Each coil may comprise for example fifteen turns of wire. The winding is in a regular lapping pattern with each coil spanning six slots exclusively, so that for example one coil 99 has its sides in slots numbered 2 and 9. The nine coils are connected to nine commutator segments 59A, 59B, ... 59I and nine tags, 60A, 60B ... 60I as shown in FIG. 5. The number of slots 62 is thus twice the number of commutator segments 59.

The above described and illustrated construction and winding arrangement of the rotor has the following advantages. As compared with a bell-shaped coreless rotor, the wound rotor 41 is easier and therefore more economical to manufacture. The known technology of automatic winding can be employed. The described rotor including the support 42 and the lamination stack 43 has considerably greater moment of inertia and is thus better adapted for driving variable loads than a lightweight bell-shaped rotor.

The arrangement of the brush holders 55 directly secured to the printed circuit board 52 requires the commutator 49 to be on the end of the shaft 38, and thus both the shaft bearings must be at the same side of the commutator. Since one bearing must be reasonably close to the commutator for proper functioning of the commutator, this requires at least one bearing (37) to be within the rotor. This internal bearing must be mounted to a tubular support (27), receiving the shaft therein, of reasonable rigidity and thus having a relatively large diameter as compared with the available overall diameter imposed on the motor by the maximum thickness dimension of the shaver casing sleeve 9 between its front and back walls. This in turn requires a relatively large diameter bore through the rotor body to give the necessary running clearances to the tubular support, for example a 6 mm. diameter rotor bore as a minimum. A bore of this diameter does not permit a conventional three or five slot rotor body construction, since said slots would have to be of such depth, to accommodate the necessary number of coil sides, as to intersect the rotor bore.

The above described enbodiment utilizes a large number (eighteen) of relatively very shallow slots 62 with only one coil side of one coil in each slot, and nine commutator segments 59. This is found to lead to further advantages. As seen in FIG. 2, with a small diameter rotor, the existence of parallel sided slots 62 leaves rotor teeth 63 of rapidly converging cross-section towards the rotor axis. The provision of shallow slots reduces this effect and maintains a magnetic flux path through the teeth of sufficient cross-sectional area. The presence of shallow slots also provides for a magnetic flux path of sufficient radial dimension between the outer surface of the rotor support 42 and the base of each slot 62.

The rotor is mechanically well balanced since the winding is fully symmetrical. The rotor is also more symmetrical electrically than a conventional rotor winding employing two coil sides pertaining to different coils in each slot, and thus a number of slots equal to the number of commutator segments. That is because in the conventional winding the first coil to be wound necessarily has both coil sides at the bottom of slots, the last coil to be wound has both its coil sides at the top of slots, and all the other coils have one coil side at the bottom of a slot and the other coil side at the top of a slot, thus causing dissymmetry of electrical resistance and less silent running.

The brushes 58 may be conventional metallic brushes, for example an ironless alloy comprising gold, silver, nickel, or copper with the possible addition of certain other elements in certain circumstances. For the above-described motor it has been found that brushes formed of an alloy comprising essentially copper with a few percent beryllium and a small amount of lead are effective. For example, brushes formed of substantially 98% copper, 1.8% beryllium, and 0.2% lead, were tested in cooperation with a nine-segment commutator formed of an alloy of substantially 70% silver and 30% palladium. It was found that the motor lifetime increased significantly. This improvement is important because the voltage is low and the current relatively high, for example 1.2 volts and 0.8 amperes in a preferred embodiment. It is thought that the small amount of lead, in use, assists the formation of a thin protective layer which is both conductive and of low sliding friction.

Figure 4:
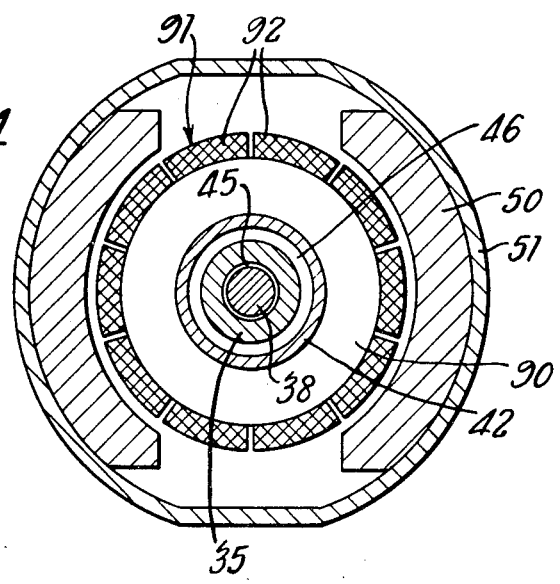
FIG. 4 is a section on line Y—Y of FIG. 3.
Figure 3:
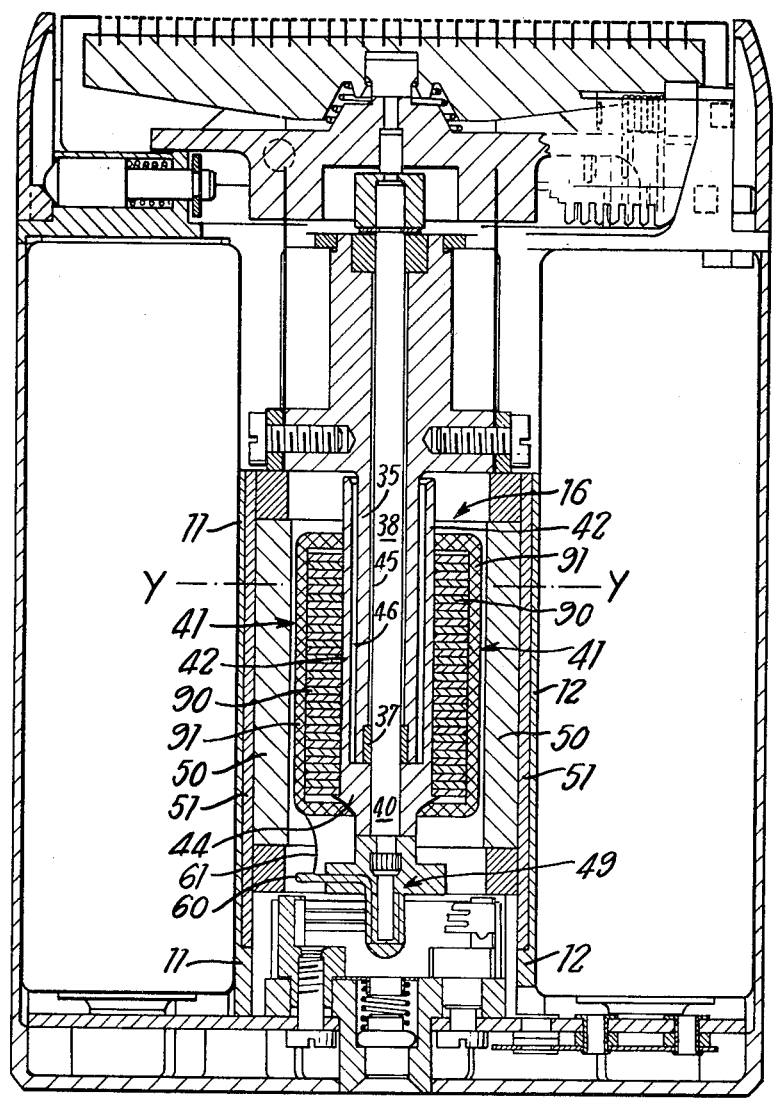
FIG. 3 is a vertical section through an electric dry shaver including a second embodiment of electric motor according to the invention.

Referring now to FIGS. 3 and 4 there is shown a second embodiment of electric motor, embodied in an electric dry shaver. Substantial portions of this shaver correspond to the first embodiment and are identified by similar reference numerals. The second embodiment differs in the arrangement of the lamination stack and the rotor windings. As shown in FIGS. 3 and 4, a stack of laminations 90 is not provided with any longitudinal slots, and a rotor winding 91 is wound directly on the outer right circular cylindrical surface of the stack 90. A preferred winding pattern is shown as comprising five coils, and thus a five segment commutator 49 is employed, the commutator having carbon brushes. The turns of wire in each coil are arranged to form coil sides 92 which are arcuate in cross-section and are spaced circumferentially from one another as seen in FIG. 4.

I claim:

1. A DC electric motor comprising a stator, a shaft, a rotor secured to said shaft for rotation within said stator, spaced bearings for said shaft, a tubular support having first and second opposite ends and carrying said spaced bearings, said shaft being journalled in said bearings for coaxial rotation within said tubular support, said shaft having a driven end portion extending from said first end of said tubular support and a driving end portion extending from said opposite end of said tubular support, said rotor comprising a hollow cylindrical body, a lamination stack carried by said body, said lamination stack being formed with a plurality of generally longitudinally extending slots, and a rotor winding comprising a plurality of coils having coil sides formed by winding a number of turns of wire around said lamination stack and into said slots in a regular lapping pattern so that each slot receives only one coil side of only one coil to provide a symmetrical winding to make said rotor substantially balanced mechanically, means securing said body at only one end thereof to said driven end portion of said shaft so that said first end length of said tubular support is coaxially freely received within said hollow cylindrical body, a commutator having a plurality of segments equal in number to one half the number of said slots, means mounting said commutator to said driven end portion of said shaft at the exterior side of said body remote from said tubular support, a circuit board extending transverse to the axis of said motor at the commutator end thereof, brushes for said motor formed of substantially 98% copper, 1.8% beryllium, and 0.2% lead for cooperating with said commutator formed of an alloy of substantially 70% silver and 30% palladium, and means for securing said brushes to said circuit board.

2. An electric motor according to claim 1 wherein said tubular support carries two said bearings at said opposite ends thereof, one said bearing lying within and the other said bearing lying outside said hollow cylindrical body.

3. An electric motor according to claim 2 wherein said means securing said hollow cylindrical body to said shaft includes a boss portion of said hollow cylindrical body, said boss portion being located adjacent said one bearing.

4. An electric motor according to claim 1 wherein said stack has eighteen slots, the winding comprises nine coils in a lapping pattern with each coil spanning six slots, and the commutator has nine segments.

5. An electric motor according to claim 1 wherein said stator comprises a pair of arcuate permanent magnets, said magnets being disposed on opposite longitudinal sides of the rotor.

6. An electric motor according to claim 5 including a magnetizable iron shell, and means securing said magnets to and within said shell.

* * * * *